(12) United States Patent
Benk

(10) Patent No.: US 12,140,924 B2
(45) Date of Patent: Nov. 12, 2024

(54) CONTROL ASSEMBLY OF AN AUTOMATION SYSTEM, AND TEST METHOD THEREFOR

(71) Applicant: Phoenix Contact GmbH & Co. KG, Blomberg (DE)

(72) Inventor: Stefan Benk, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 379 days.

(21) Appl. No.: 17/605,323

(22) PCT Filed: Apr. 16, 2020

(86) PCT No.: PCT/EP2020/060724
§ 371 (c)(1),
(2) Date: Oct. 21, 2021

(87) PCT Pub. No.: WO2020/216672
PCT Pub. Date: Oct. 29, 2020

(65) Prior Publication Data
US 2022/0179387 A1    Jun. 9, 2022

(30) Foreign Application Priority Data

Apr. 24, 2019  (DE) ..................... 10 2019 110 625.7

(51) Int. Cl.
*G05B 19/05* (2006.01)
*G08B 5/36* (2006.01)
*G08B 21/18* (2006.01)

(52) U.S. Cl.
CPC ......... *G05B 19/058* (2013.01); *G05B 19/054* (2013.01); *G08B 5/36* (2013.01); *G08B 21/187* (2013.01)

(58) Field of Classification Search
None
See application file for complete search history.

(56) References Cited

U.S. PATENT DOCUMENTS 3,829,842 A * 8/1974 Langdon .............. G05B 19/058
700/287
2004/0039456 A1    2/2004 Davlin et al.
(Continued)

FOREIGN PATENT DOCUMENTS

CN    101430561 B    2/2011
DE       2940187 C2    1/1983
(Continued)

OTHER PUBLICATIONS

Authorized Officer: Nora Lindner, English translation of International Preliminary Report on Patentability issued in counterpart PCT application No. PCT/EP2020/060724, Sep. 28, 2021, 10 pp.
(Continued)

*Primary Examiner* — David Earl Ogg
(74) *Attorney, Agent, or Firm* — Kaplan Breyer Schwarz, LLP

(57) ABSTRACT

A control assembly of an automation system, having at least two row modules which are arranged in a row one after the other and have an actual order, includes a control and/or communication module and/or an I/O module, as well as a test module. The row modules are each equipped with an indicator element which can assume two distinguishable states. Further, a test method for the control assembly.

15 Claims, 2 Drawing Sheets

(56) References Cited

U.S. PATENT DOCUMENTS

| | | | |
|---|---|---|---|
| 2005/0107976 A1* | 5/2005 | Klijn | G01R 31/3272 |
| | | | 702/118 |
| 2011/0022186 A1* | 1/2011 | Davlin | G05B 19/0421 |
| | | | 700/79 |
| 2016/0173344 A1* | 6/2016 | Zinner | H04L 43/0817 |
| | | | 370/245 |

FOREIGN PATENT DOCUMENTS

| | | | |
|---|---|---|---|
| EP | 3166373 B1 | | 1/2019 |
| JP | 3161487 B2 | | 4/2001 |
| JP | 2011-081661 A | | 4/2011 |
| KR | 10-2016-0074908 A | | 6/2016 |
| KR | 20160074908 A | * | 6/2016 |

OTHER PUBLICATIONS

Authorized Officer: Lefeure, Guillaume, International Search Report issued in counterpart PCT application No. PCT/EP2020/060724, Jun. 16, 2020, 5 pp.

Examiner: Liu Hui, Office Action issued in Chinese Patent Application No. 202080031280.6, Jul. 9, 2024, 12 pp. w/ translation.

\* cited by examiner

| A | 15 | 25 | 35 | 45 | B | 15 | 25 | 35 | 45 | C | 15 | 25 | 35 | 45 |
|---|---|---|---|---|---|---|---|---|---|---|---|---|---|---|
| t0 | 0 | 0 | 0 | 0 | | 0 | 0 | 0 | 0 | | 0 | 0 | 0 | 0 |
| t1 | 1 | 0 | 0 | 0 | | 1 | 0 | 0 | 0 | | 0 | 0 | 0 | 0 |
| t2 | 0 | 1 | 0 | 0 | | 0 | 0 | 1 | 0 | | 1 | 0 | 0 | 0 |
| t3 | 0 | 0 | 1 | 0 | | 0 | 1 | 0 | 0 | | 0 | 1 | 0 | 0 |
| t4 | 0 | 0 | 0 | 1 | | 0 | 0 | 0 | 1 | | 0 | 0 | 1 | 0 |
| t5 | 0 | 0 | 0 | 0 | | 0 | 0 | 0 | 0 | | 0 | 0 | 0 | 1 |
| t6 | | | | | | | | | | | 0 | 0 | 0 | 0 |

| D | 15 | 25 | 35 | 45 | E | 15 | 25 | 35 | 45 | F | 15 | 25 | 35 | 45 |
|---|---|---|---|---|---|---|---|---|---|---|---|---|---|---|
| t0 | 0 | 0 | 0 | 0 | | 0 | 0 | 0 | 0 | | 0 | 0 | 0 | 0 |
| t1 | 1 | 1 | 1 | 1 | | 1 | 0 | 0 | 0 | | 1 | 0 | 0 | 0 |
| t2 | 1 | 0 | 0 | 0 | | 1 | 0 | 0 | 0 | | 1 | 0 | 0 | 0 |
| t3 | 0 | 1 | 0 | 0 | | 0 | 1 | 0 | 0 | | 0 | 0 | 0 | 0 |
| t4 | 0 | 0 | 1 | 0 | | 0 | 0 | 1 | 0 | | 0 | 0 | 1 | 0 |
| t5 | 0 | 0 | 0 | 1 | | 0 | 0 | 0 | 1 | | 0 | 0 | 0 | 1 |
| t6 | 0 | 0 | 0 | 0 | | 0 | 0 | 0 | 0 | | 0 | 0 | 0 | 0 |

| G | 15 | 25 | 35 | 45 | H | 15 | 25 | 35 | 45 | I | 15 | 25 | 35 | 45 |
|---|---|---|---|---|---|---|---|---|---|---|---|---|---|---|
| t0 | 0 | 0 | 0 | 0 | | 0 | 0 | 0 | 0 | | 0 | 0 | 0 | 0 |
| t1 | 1 | 0 | 0 | 0 | | 1 | 0 | 0 | 0 | | 1 | 0 | 0 | 0 |
| t2 | 1 | 1 | 0 | 0 | | 1 | 1 | 0 | 0 | | 1 | 1 | 0 | 0 |
| t3 | 0 | 1 | 1 | 0 | | 0 | 1 | 0 | 1 | | 1 | 1 | 1 | 0 |
| t4 | 0 | 0 | 1 | 1 | | 0 | 0 | 1 | 1 | | 1 | 1 | 1 | 1 |
| t5 | 0 | 0 | 0 | 1 | | 0 | 0 | 1 | 0 | | 0 | 0 | 0 | 0 |
| t6 | 0 | 0 | 0 | 0 | | 0 | 0 | 0 | 0 | | | | | |

Fig. 2

CONTROL ASSEMBLY OF AN AUTOMATION SYSTEM, AND TEST METHOD THEREFOR

FIELD

The present invention relates to a control assembly of an automation system, comprising a control and/or communication module and at least two I/O modules which are arranged in a row, and to a test method for such a control assembly.

BACKGROUND

When configuring, installing, and wiring I/O modules (input/output modules) of a control assembly of an automation system, in particular for industrial machines and systems, it is crucial that the user can see a clear relationship between an installed physical I/O module and an I/O module provided according to plan. On the one hand, this makes wiring easier for the user, in particular with additional modules such as sensors and actuators, and, on the other hand, helps to avoid errors.

A relationship between an installed physical I/O module and an I/O module that is provided according to the planning can be established or identified particularly easily if the physical I/O modules arranged in a row have an order that corresponds to a planned order.

For example, if the planned order for the I/O modules results from the planned control logic, the physical order of the installed I/O modules should match the logical order of the I/O modules according to the planned control logic. A clear relationship between the physical and logical order and thus a relationship between an installed physical I/O module and an I/O module that is provided according to the planning can then be established for or recognized by the user.

Usually, for example, additional contacts are provided to determine or check the order of the I/O modules, which contacts allow an automatic assignment of a physical I/O module to an I/O module in the planned control logic. "Automatic" means that the order is determined or checked depending on the type of I/O module. An order is automatically recognized as correct if an I/O module of the intended type is installed at a certain position. However, if there is a plurality of the same type in the row of I/O modules, the order may be incorrectly recognized as correct, even though modules have been swapped.

Alternatively, a physical I/O module can be assigned to an I/O module in the planned control logic manually using unique features such as serial numbers or MAC addresses. Alternatively, a physical I/O module is assigned to an I/O module in the planned control logic in such a way that an indicator is set according to the planned control logic at the physical I/O module manually using buttons or switches, for example rotary or DIP switches (DIP=Dual in-line package).

However, all of the options mentioned have the disadvantage that the correct order of the physical I/O modules or a clear relationship between the physical and logical order of the I/O modules is cumbersome for the user and cannot be directly identified or checked by the user. This can quickly lead to wiring errors. For example, an emergency stop switch can then activate or deactivate an incorrect working circuit if a control assembly combines a plurality of identical input and/or output modules.

SUMMARY

A problem addressed by the present invention is therefore that of allowing the user to check a control assembly in a novel and simple manner, in particular in the form of a target/actual comparison, to determine whether the physical row modules arranged in a row, in particular I/O modules are also arranged or installed in the correct order.

The check can be used, for example, to verify and/or validate an installed control assembly. During the verification (Latin veritas, "truth" and facere, "to make"), it is checked whether a product complies with the specified or planned requirements, while during the validation (Latin validus, "strong," "effective," "firm") it is checked whether a product achieves the specified usage goals of the user.

To solve this problem, the invention proposes a control assembly of an automation system having the features of independent claim 1 and a test method having the features of independent claim 8. Further advantageous embodiments of the control assembly according to the invention are specified in the dependent claims. The features and advantages specified for the control assembly according to the invention also apply, mutatis mutandis, to the method according to the invention.

Accordingly, a control assembly of an automation system is proposed having at least two row modules, comprising a test module and a control and/or communication module and/or an I/O module. The row modules are arranged in a row and have an actual order. The modules are also connected to one another via signals. Furthermore, the row modules are each equipped with an indicator element which can assume two distinguishable states. The test module has stored a target order for the row modules arranged in rows and is designed to send a test signal to each of the row modules one after the other in accordance with the target order. Each of the indicator elements is designed to change its state in response to a test signal received by its row module.

Expediently, all modules communicate with one another on an equal footing, i.e., there is no master or slave. In addition, an indicator element is expediently designed to change its state again in response to the fact that its row module no longer receives a test signal. For example, the first of the two possible states of each of the indicator elements can be an idle state and the second state can be an active state, or vice versa.

The advantage of the control assembly according to the invention is that the user who knows that the row modules receive a test signal from the test module one after the other according to the stored target order can now easily see whether the indicator element in a row module changes its state in a distinguishable manner after the others along the installed row of row modules. Thus, it is now also easy for the user to check whether the actual order of the installed row modules corresponds to the planned target order of the row modules.

It is particularly advantageous that the correct order of the row modules can be recognized or checked directly at the physical row modules and, in particular, can take place at any time, for example before, during and/or after the start-up of the control assembly. Compared to the prior art, no additional contacts on the row modules and in particular the I/O modules are required to verify the correct order.

According to a further development of the control assembly, the indicator element, with which each of the row modules is provided, can expediently assume two different visually perceptible states and/or comprises an LED (light-emitting diode), in particular a power LED or a bi-color LED. Alternatively, the indicator element can also be used as a display element on a display, in particular a matrix display. The user can therefore see the change in status of the indicator elements with the naked eye and can therefore check whether the actual order of the installed row modules corresponds to the planned target order of the row modules. If the target and actual order of the row modules match, the visually perceptible changes in status of the indicator elements, which occur along the installed row of row modules in one row module after the other, advantageously produce an effect comparable to a running light. However, if the actual order of the installed row modules and the planned target order of the row modules do not match, this has a disruptive effect on the running light effect, which is easily recognizable by the user.

According to another development of the control assembly, the indicator element is deactivated in a first state, i.e., for example does not shine, and is activated in a second state, i.e., for example shines, or the indicator element is activated in a first state to shine at a first brightness, and is activated in a second state to shine at a second brightness different from the first, or the indicator element is activated in a first state to shine in a first color, and is activated in a second state to shine in a second color different from the first. Each of the three variants is suitable for producing the aforementioned running light effect, wherein disturbances or irregularities in the movement of the running light indicate to the user that the actual order of the installed row modules does not match the planned target order of the row modules.

The control module can be designed as software and/or hardware. The control module can be designed as a separate row module or be designed together with the communication module and/or the test module as one row module. The control module can also be designed as a row module together with an I/O module. The control module can also be designed to be distributed over a plurality of row modules. The test module can also be designed as software and/or hardware. The test module can be designed as a separate row module or be designed together with the control module and/or the communication module as one row module. The test module can also be designed as a row module together with an I/O module. The test module can also be designed to be distributed over a plurality of row modules. The communication module can be designed, for example, as a bus coupler.

According to another development of the control assembly, the test module is comprised of the control and/or communication module, for example as a functional unit or functional block, or the test module is comprised of an I/O module, or the test module is comprised of a configuration device which is connected to the control and/or communication module via signals, for example as part of an engineering or planning tool on a PC, or the test module is designed as a separate module that is connected to the control and/or communication module via signals, for example as an application on a mobile laptop or tablet computer.

According to another development of the control assembly, the test module has stored the target order in the form of an installation plan, a wiring plan, or a planned control logic.

According to another development of the control assembly, the test module is designed to use a specific pattern when sending the test signals to the row modules. For example, a test signal can have a certain duration, or a pause of certain duration can be added before and/or after a test signal, or the next test signal is already sent while one test signal is still ongoing, so that two test signals are sent simultaneously for a certain duration.

According to another development of the control assembly, the row modules have fastening means for installation on a mounting rail and/or fastening means for installation on a component installed on a mounting rail. The fastening means allow a simple installation of the modules in that they can expediently be pushed laterally onto the mounting rail or put on the mounting rail from the front and locked. The mounting rail can in particular be designed as a top hat rail.

A test method for a control assembly of an automation system is also proposed as described above, having at least two row modules, comprising a test module and a control and/or communication module and/or an I/O module. The row modules are arranged in a row one after the other and have an actual order. Furthermore, the row modules are each equipped with an indicator element, and the test module has stored a target order for the row modules arranged in a row. In addition, the modules are connected to one another via signals. In the test method, each of the indicator elements initially assumes a first state. The test module then successively sends a test signal to each of the row modules in accordance with the stored target order, wherein the indicator element of one of the row modules assumes a second state that is distinguishable from the first state in response to the receipt of a test signal.

An indicator element expediently assumes the first state again if its row module no longer receives a test signal.

As already mentioned, the test signals can be sent to the row modules according to a specific pattern. For example, a test signal can have a specific duration, or a pause of a specific duration can be added before and/or after a test signal.

BRIEF DESCRIPTION OF THE DRAWINGS

These and further features and advantages of the present invention can also be found in the embodiments, which are explained in more detail below with reference to the accompanying drawings, in which FIG. 2 shows a schematic, tabular representation of the results of various test method sequences for the control assembly according to FIG. 1.

DETAILED DESCRIPTION

Figure 1:
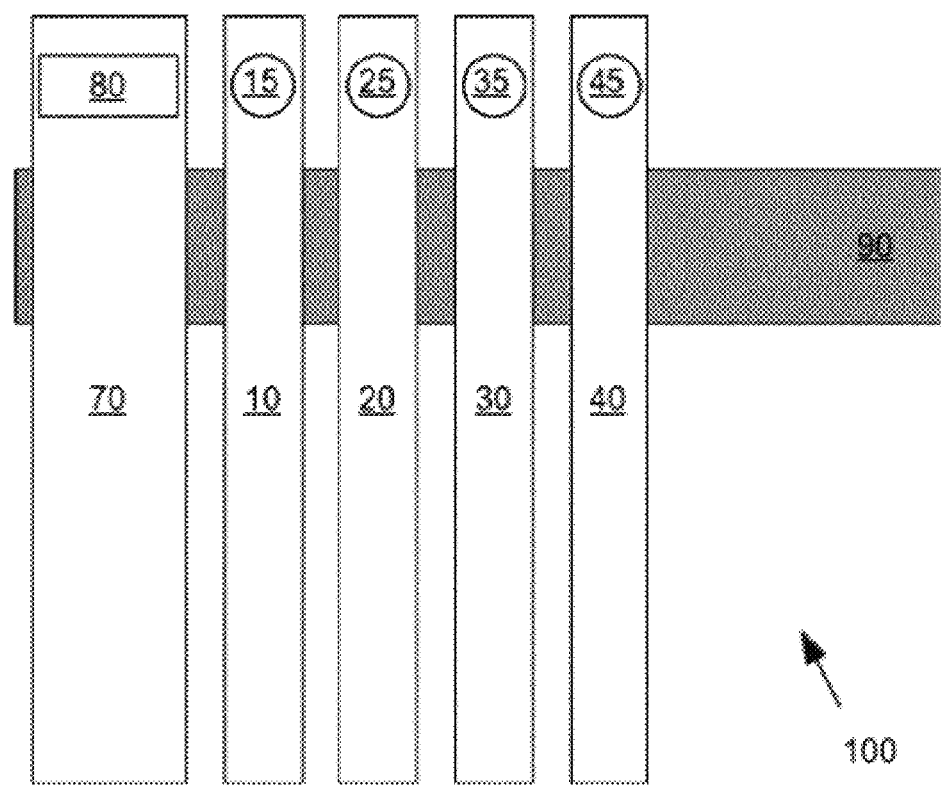
FIG. 1 shows a schematic representation of a control assembly of an automation system.

An embodiment of a control assembly 100, which can also be referred to as a local control network, is shown in FIG. 1. The control assembly 100 here comprises the control and/or communication module 70, the test module 80 and four I/O modules 10, 20, 30 and 40.

The control and/or communication module 70 functions here both as a control module (not shown in more detail for reasons of clarity), which can be designed, for example, as a PLC (programmable logic controller) executing a user program, and as a communication module (not for reasons of clarity shown in more detail), which provides at least one communication interface for the control assembly 100 via which the control assembly can be coupled, for example, to a communication network (not shown in greater detail for reasons of clarity) of the automation system, and is therefore referred to below as a control and communication module. The test module 80 is comprised here of the control and communication module, for example as a functional block within the user program.

In this control assembly 100, the control and communication module 70 and the test module 80 are designed together as one row module. The four I/O modules 10 to 40 each form a further row module.

The I/O modules 10, 20, 30 and 40 are arranged here next to the control and communication module 70 in a row one after the other or next to one another and thus have an existing actual order. Each of the I/O modules has an indicator element which can assume two distinguishable states: the I/O module 10 has the indicator element 15; the I/O module 20 has the indicator element 25; the I/O module 30 has the indicator element 35 and the I/O module 40 has the indicator element 45. The row element having the control and communication module and the test module does not have an indicator element here. In principle, however, each row module could have an indicator element.

The control and communication module 70 and the I/O modules 10 to 40 are here, in an expedient embodiment, installed on a mounting rail 90 designed as a top hat rail. For this purpose, the row modules have, for example, corresponding fastening means (not shown in greater detail for reasons of clarity) on their rear side which allow the modules to be easily installed on the rail, for example by snapping or clamping.

Each of the I/O modules 10 to 40 is connected in a signal-conducting manner to the control and communication module 70 and thus also to the test module 80, in that the modules are connected here to a bus (not shown in greater detail for reasons of clarity). The bus can be a local bus, for example, which is received in the mounting rail 90.

A target order for the I/O modules 10 to 40 arranged in a row is stored in the test module 80, here a planned control logic, the test module being designed, here in cooperation with the control and communication module 70, to send a test signal to each of the I/O modules 10 to 40 one after the other in accordance with the target order of the I/O modules resulting from the planned control logic. The row element having the control and communication module and the test module is not taken into account in this example when checking the order. In principle, however, each row module could also be taken into account and checked with regard to the correspondence of its position in the actual order with the planned position according to the target order.

Each of the indicator elements 15 to 45 is designed to change its state in response to a test signal of the test module 80 received by its I/O module. The indicator elements 15 to 45 expediently each have an LED that can assume two different visually perceptible states, wherein the LED of an indicator element is deactivated in a first state and therefore does not shine and is activated to shine in a second state. Alternatively, the LED of an indicator element could be activated in a first state to shine at a first brightness, and in a second state it could be activated to shine at a second brightness different from the first. Alternatively, the LED of an indicator element is designed as a bi-color LED and could be activated in a first state to shine in a first color and activated in a second state to shine in a second color different from the first, for example red and green.

However, the indicator elements 15 to 45 should preferably be designed in the same way. It should also be noted that the indicator elements 15 to 45 can additionally also be designed for purposes other than the purpose according to the invention, for example to display an operating state of the I/O module.

In an embodiment of a control assembly other than that shown in FIG. 1, the control module and the test module could be designed to be distributed over the existing row modules, in particular the existing I/O modules. That is, the control logic and the test logic (including the target order) are a distributed component in all row modules, in particular in all row modules that comprise I/O modules. The row module which comprises the communication module can be designed as a bus coupler, via which the control assembly can be coupled to a communication network of the automation system.

FIG. 2 shows in tabular form the results of nine different sequences of exemplary test methods A to I, which were carried out for the control assembly 100 according to FIG. 1. For each test method A to I, the states of the indicator elements 15 to 45 of the I/O modules 10 to 40 at specific points in time t1 to t5 during the course of the test method are specified, wherein a first state of the two possible states of an indicator element is symbolized with "0" and a second state with "1." As already mentioned with regard to FIG. 1, the indicator elements 15 to 45 expediently each comprise an LED, wherein in this example the first state of the indicator element can be recognized as the LED not shining and the second state as the LED shining.

In all nine test methods, according to the target order stored in the test module 80, for example four I/O modules are provided, to which a test signal is sent one after the other in accordance with the target order.

Different patterns were used for test methods A, C, D, E, G, and I, which will be explained in more detail later. In any case, all six test methods ran successfully, i.e., without any recognizable errors. On the other hand, in test methods B, F and H errors can be seen, wherein in case B the same pattern was used as in case A, in case F the same pattern was used as in case E, and in case I the same pattern was used as in case H.

What happens in the particular test method A to I from the starting point in time t1 to the end point in time t4 or t5 will now be considered in detail. It is assumed that the indicator elements 15 to 45 are in a first state, which is symbolized here with "0," if they do not receive a test signal.

In test method A, test module 80 successively sends a test signal to each row module 10 to 40 designed as an I/O module in accordance with the stored target order of the row modules. This means: At point in time t1 a test signal is sent to the first I/O module according to the target order, at point in time t2 a test signal is sent to the second I/O module according to the target order, at point in time t3 a test signal is sent to the third I/O module according to the target order, and at point in time t4 a test signal is sent to the first I/O module according to the target order.

The table shows that at point in time t1, in response to the test signal, the indicator element 15 of the I/O module 10, which is the first in the actual order, has actually assumed the second state, which is symbolized here with "1," while the remaining indicator elements 25 to 45 have not changed their state.

At point in time t2, in response to the test signal, the indicator element 25 of the I/O module 20, which is the second in the actual order, has actually assumed the second state, while the indicator elements 35 and 45 have not changed their state and the indicator element 15 has returned to the first state because its I/O module has no longer received a test signal.

At point in time t3, in response to the test signal, the indicator element 35 of the I/O module 30, which is the third in the actual order, has actually assumed the second state, while the indicator elements 15 and 45 have not changed their state and the indicator element 25 has returned to the first state because its I/O module has no longer received a test signal.

At point in time t4, in response to the test signal, the indicator element 45 of the I/O module 40, which is the fourth in the actual order, has actually assumed the second state, while the indicator elements 15 and 25 have not changed their state and the indicator element 35 has returned to the first state because its I/O module has no longer received a test signal.

Test method A has thus shown that the target order and the actual order match.

The user who is looking at the physical I/O modules 10 to 40 arranged in a row during the test method can see the correspondence of the target and actual order based on a running light "wandering" uniformly along the physical I/O modules 10 to 40 arranged in a row, i.e., at each point in time t1 to t4 only one LED lights up along the physical I/O modules arranged in a row with one I/O module after the other.

In the table for test method A, this "wandering" running light can be recognized by the "wandering 1" from one column to the next column in the course from point in time t1 to point in time t4.

To better illustrate the running light effect, the cells in the tables in FIG. 2 which contain a "1" are highlighted.

In test procedure B, the same pattern is used for sending the test signals as in test procedure A, and the I/O modules 10 to 40 are installed in the same actual order as in test method A. However, in the table for test method B it can be seen that, in the course of point in time t1 to point in time t4, the "1" does not "wander" from one column to the next column, but that the "1," for example, skips a column, jumps back a column, and skips another column.

The user who is looking at the physical I/O modules 10 to 40 arranged in a row during the test method can see a light "jumping" back and forth or a "disturbed" running light, i.e., at any point in time t1 to t4; only one LED is shining, but not along the physical I/O modules arranged in a row in one I/O module after the other, rather from the first to the third I/O module, to the second, to the fourth in the row.

This indicates the presence of an error or a mismatch between the target and actual order of the I/O modules. However, since the actual order is the same as in case A, a different target order must be used as a basis for the I/O modules.

At point in time t1 a test signal is sent to the first I/O module according to the target order, at point in time t2 a test signal is sent to the second I/O module according to the target order, and at point in time t3 a test signal is sent to the third I/O module according to the target order, and at point in time t4 a test signal is sent to the first I/O module according to the target order.

At point in time t2, the indicator element 35 of the I/O module 30, which is the third in the actual order, has assumed the second state in response to the test signal. Also, at point in time t3, the indicator element 25 of the I/O module 20, which is the second in the actual order, has assumed the second state in response to the test signal. According to the target order on which the test method B is based, the I/O module 30 having the indicator element 35 is provided in the second position and the I/O module 20 having the indicator element 25 in the third position. That is, the I/O modules 20 and 30 are arranged so as to be reversed in the actual order.

Test method C largely corresponds to test method A, wherein the pattern for sending the test signals is modified so that there is a pause at point in time t1 and the first test signal is not sent to the first I/O module according to the target order until point in time t2. The pause at point in time t1 is used to reliably and simply identify the first module in the order. The modules could also be reversed cyclically without a pause; for module 10 at position 4 of the actual order and thus module 20 at position 1 of the actual order, the user would still see a running light and possibly not notice the error.

Test method D largely corresponds to test method C, wherein the pattern for sending the test signals is modified so that a test signal is sent to each I/O module instead of pausing at point in time t1, after which the first test signal is then sent to first I/O module according to the target order at point in time t2. This pattern has the advantage that the start of the test method can be clearly seen.

The user who is looking at the physical I/O modules 10 to 40 arranged in a row during the test method can see the start of the test method as all LEDs of the indicator elements 15 to 45 of the I/O modules 10 to 40 shining.

Test method E largely corresponds to test method A, wherein the pattern for sending the test signals is modified so that, at point in time t2, a test signal is sent again to the first I/O module according to the target order and a test signal is only sent to the second I/O module according to the target order at point in time t3.

This pattern has the advantage that it sends a test signal of longer duration to the first I/O module according to the target order than to the other I/O modules, so that an indicator element in which the second state is of longer duration than in the other I/O modules is clearly visible as the first according to the target order.

The user who is looking at the physical I/O modules 10 to 40 arranged in a row during the test method can easily see the first I/O module according to the target order by the fact that the LED of its indicator element, here indicator element 15, shines longer than the LED of the indicator elements of the remaining I/O modules. This is particularly advantageous if the row of I/O modules only comprises two modules.

In test method F, the same pattern is used for sending the test signals as in test method E, and the I/O modules 10 to 40 are installed in the same actual order as in test method E. However, the table for test method F shows that a "1" is never entered in the column for the indicator element 25. Instead, at point in time t3, at which the test module 80 sends a test signal to the second I/O module according to the stored target order, a "0" is entered in the column for the indicator element 25.

The user who is looking at the physical I/O modules 10 to 40 arranged in a row can see a light "jumping" from the indicator element 15 of the I/O module 10 to the indicator element 35 of the I/O module 35 with a delay, or a "disturbed" running light.

This indicates the presence of an error and in particular a faulty or incorrectly connected I/O module 20.

Test method G largely corresponds to test method A, wherein the pattern for sending the test signals is modified so that, at point in time t2, not only is a test signal sent to the second I/O module according to the target order, but a test signal is also sent to the first I/O module according to the target order. At point in time t3, not only is a test signal sent to the third I/O module according to the target order, but also another test signal is sent to the second I/O module according to the target order. At point in time t4, not only is a test signal sent to the fourth I/O module according to the target order, but also another test signal is sent to the third I/O module according to the target order. At point in time t5, a test signal is then sent again solely to the fourth I/O module according to the target order.

Such a pattern has the advantage that a test signal of longer duration is sent to each I/O module, wherein the next test signal for the next I/O module according to the target order has already begun to be sent even though the previous test signal has not finished being sent. This makes it easier to identify the predecessor and successor I/O modules of an I/O module that are planned according to the target order.

The user who is looking at the physical I/O modules 10 to 40 arranged in a row during the test method can see the correspondence of the target and actual order based on a double running light or bar-like running light "wandering" uniformly along the physical I/O modules 10 to 40 arranged in a row.

The pattern for sending the test signals could be modified again based on the pattern from test method E, so that it is easier to identify the predecessor and successor I/O modules of an I/O module planned according to the target order. This is possible if a test signal has already begun to be sent for the I/O module before the previous test signal has finished being sent for the previous I/O module according to the target order and only ends when the next test signal has already begun to be sent for the next I/O module according to the target order. However, a test method using this pattern is not shown in FIG. 2.

In test method H, the same pattern is used for sending the test signals as in test method G, and the I/O modules 10 to 40 are installed in the same actual order as in test method G. However, in the table for test method H it can be seen that, from point in time t1 to point in time t4, the "1" does not "wander" from one column to the next column, but that the "1" skips one column and then jumps back one column.

The user who is looking at the physical I/O modules 10 to 40 arranged in a row can see a corresponding "jumping" light or a "disturbed" running light. Above all, a temporarily separating double running light or a temporarily separating bar-like running light can be seen.

This indicates the presence of an error or a mismatch between the target and actual order of the I/O modules. Since the actual order is the same as in case E, a different target order must be used for the I/O modules.

At point in time t3, a test signal is first sent to the third I/O module according to the target order and a test signal is sent again to the second I/O module according to the target order. At point in time t4, a test signal is first sent to the fourth I/O module according to the target order and a test signal is again sent to the third I/O module according to the target order. At point in time t5, a test signal is then sent again solely to the fourth I/O module according to the target order.

At point in time t3, the indicator element 45 of the I/O module 40, which is the fourth in the actual order, has assumed the second state in response to the test signal for the third I/O module according to the target order. At point in time t4, the indicator element 35 of the I/O module 30, which is the third in the actual order, has assumed the second state in response to the test signal for the fourth I/O module according to the target order.

According to the target order on which the test method F is based, the I/O module 40 having the indicator element 45 is provided in the third position and the I/O module 30 having the indicator element 35 in the fourth position. That is, the I/O modules 30 and 40 are arranged so as to be reversed in the actual order.

Test method I largely corresponds to test method A, wherein the pattern for sending the test signals is modified so that, at point in time t2, not only is a test signal sent to the second I/O module according to the target order, but a test signal is also sent to the first I/O module according to the target order. At point in time t3, not only is a test signal sent to the third I/O module according to the target order, but also another test signal is sent to the second and first I/O module according to the target order. At point in time t4, not only is a test signal sent to the fourth I/O module according to the target order, but also another test signal is sent to the third, second, and first I/O module according to the target order. Whenever a test signal is sent to the next I/O module according to the target order, all previous I/O modules according to the target order continue to receive a test signal.

This pattern can be seen as an alternative to the pattern according to test methods G and H and likewise offers the advantages that the second state of the indicator elements lasts longer and the predecessor and successor I/O modules of an I/O module planned according to the target order are easier to recognize.

The user who is looking at the physical I/O modules 10 to 40 arranged in a row during the test method can see the correspondence of the target and actual order based on a "light bar" that grows increasingly longer uniformly along the physical I/O modules 10 arranged in a row up to 40 and extends over all I/O modules to the end of the test method, in this case at point in time t4.

From the present description of the invention and the embodiments, it is apparent to a person skilled in the art that many further variants for creating and using a running light effect are possible.

In an embodiment other than the one shown in FIG. 2, the control module and the test module could be designed to be distributed over the existing row modules, in particular the existing I/O modules, and the test logic including the target order can be a distributed component in all row modules, in particular in all row modules which comprise I/O modules. The test logic can be designed in such a way that the row modules initially agree on a common time base. Then, at point in time t1, that physical row module which should be the first according to the target order controls its indicator element with a test signal. Then, at point in time t2, that physical row module which should be the second, etc., according to the target order controls its indicator element with a test signal. The user can then see whether or not the actual order of the physical row modules is correct, i.e., it matches the target order, based on a running light "wandering" or "jumping" over the indicator elements of the row modules.

LIST OF REFERENCE NUMERALS

10, 20, 30, 40 I/O module
15, 25, 35, 45 Indicator element
70 Control and/or communication module
80 Test module
90 Mounting rail, top hat rail, if necessary with local bus topology
100 Control assembly

The invention claimed is:

1. A control assembly of an automation system, comprising:
  at least two row modules, which are arranged in a row one after the other and have an actual order,
  wherein one of the row modules comprises a control and communication module and a test module, wherein another one of the row modules comprises an input/output (I/O) module,
wherein the row modules communicate with one another,
wherein the at least two row modules are each equipped with an indicator element which can assume two distinguishable states,
wherein the test module has stored a target order for the row modules arranged in the row and is designed to send a test signal to each of the row modules one after the other in accordance with the target order, and
wherein each of the indicator elements is designed to change its state in response to the test signal received by its row module.

2. The control assembly according to claim 1,
wherein the indicator element can assume two different visually perceptible states and/or comprises a light emitting diode (LED).

3. The control assembly according to claim 1,
wherein the indicator element is deactivated in a first state and activated in a second state, or
wherein the indicator element is deactivated in a first state and activated in a second state to shine, or
wherein the indicator element is activated in a first state to shine at a first brightness, and in a second state is activated to shine at a second brightness different from the first, or
wherein the indicator element is activated in a first state to shine in a first color, and in a second state is activated to shine in a second color different from the first.

4. The control assembly according to claim 1,
wherein the test module;
is part of the control and communication module, or
comprises at least one I/O module, or
comprises a configuration device which is connected to the control and communication module, or
is configured as a separate module that is connected to the control and communication module.

5. The control assembly according to claim 1,
wherein the test module has stored the target order in the form of an installation plan, a wiring plan, or a planned control logic.

6. The control assembly according to claim 1,
wherein the test module is configured to use a specific pattern when sending the test signals to the row modules.

7. The control assembly according to claim 1,
wherein the row modules have fastening means for installation on a mounting rail and/or fastening means for installation on a component installed on a mounting rail.

8. A test method for a control assembly of an automation system according to claim 1,
wherein each of the indicator elements initially assumes a first state and the test module then successively sends a test signal to each of the row modules in accordance with the stored target order, and
wherein the indicator element of one of the row modules assumes a second state that is distinguishable from the first state in response to the receipt of a test signal.

9. The control assembly according to claim 2, wherein the LED is a power LED or bi-color LED.

10. A control assembly of an automation system, comprising:
at least two row modules, which are arranged in a row one after the other and have an actual order,
wherein one of the row modules comprises a control module and a test module,
wherein another one of the row modules comprises an input/output (I/O) module,
wherein the row modules communicate with one another,
wherein the at least two row modules are each equipped with an indicator element which can assume two distinguishable states,
wherein the test module has stored a target order for the row modules arranged in the row and is designed to send a test signal to each of the row modules one after the other in accordance with the target order, and
wherein each of the indicator elements is designed to change its state in response to the test signal received by its row module.

11. The control assembly according to claim 10,
wherein the test module:
is part of the control module, or
comprises at least one I/O module, or
comprises a configuration device which is connected to the control module, or
is configured as a separate module that is connected to the control module.

12. A test method for a control assembly of an automation system according to claim 10,
wherein each of the indicator elements initially assumes a first state and the test module then successively sends a test signal to each of the row modules in accordance with the stored target order, and
wherein the indicator element of one of the row modules assumes a second state that is distinguishable from the first state in response to the receipt of a test signal.

13. A control assembly of an automation system, comprising:
at least two row modules, which are arranged in a row one after the other and have an actual order,
wherein one of the row modules comprises a communication module and a test module,
wherein another one of the row modules comprises an input/output (I/O) module,
wherein the row modules communicate with one another,
wherein the at least two row modules are each equipped with an indicator element which can assume two distinguishable states,
wherein the test module has stored a target order for the row modules arranged in the row and is designed to send a test signal to each of the row modules one after the other in accordance with the target order, and
wherein each of the indicator elements is designed to change its state in response to the test signal received by its row module.

14. The control assembly according to claim 13,
wherein the test module:
is part of the communication module, or
comprises at least one I/O module, or
comprises a configuration device which is connected to the communication module, or
is configured as a separate module that is connected to the communication module.

15. A test method for a control assembly of an automation system according to claim 13, wherein each of the indicator elements initially assumes a first state and the test module then successively sends a test signal to each of the row modules in accordance with the stored target order, and
wherein the indicator element of one of the row modules assumes a second state that is distinguishable from the first state in response to the receipt of a test signal.

* * * * *